(12) United States Patent
Elsom et al.

(10) Patent No.: US 10,306,906 B2
(45) Date of Patent: Jun. 4, 2019

(54) CHILLED FOOD PRODUCT DISPENSER AND METHOD WITH ADAPTIVE CONTROL OF REFRIGERATION SYSTEM

(71) Applicant: H. C. Duke & Son LLC, East Moline, IL (US)

(72) Inventors: Kyle B. Elsom, LeClaire, IA (US); James A. Quandt, East Moline, IL (US)

(73) Assignee: H. C. Duke & Son LLC, East Moline, IL (US)

( * ) Notice: Subject to any disclaimer, the term of this patent is extended or adjusted under 35 U.S.C. 154(b) by 403 days.

(21) Appl. No.: 14/820,148

(22) Filed: Aug. 6, 2015

(65) Prior Publication Data

US 2015/0342217 A1 Dec. 3, 2015

Related U.S. Application Data

(63) Continuation of application No. PCT/US2014/014557, filed on Feb. 4, 2014.

(60) Provisional application No. 61/761,616, filed on Feb. 6, 2013.

(51) Int. Cl.
*A23G 9/22* (2006.01)
*F25B 49/02* (2006.01)
*F25D 29/00* (2006.01)

(52) U.S. Cl.
CPC ............ *A23G 9/228* (2013.01); *F25B 49/022* (2013.01); *F25D 29/00* (2013.01); *F25B 2600/0251* (2013.01); *F25B 2700/2117* (2013.01)

(58) Field of Classification Search
CPC . A23G 9/228; F25D 29/00; F25B 2700/2117; F25B 2600/0251; B64D 1/0858; B64D 1/0857; B64D 1/0859; B64D 1/0862; B64D 3/0009; B64D 1/0076
See application file for complete search history.

(56) References Cited

U.S. PATENT DOCUMENTS

| 4,008,832 A | * | 2/1977 | Rodth | B67D 1/0861 222/129.1 |
| 4,551,025 A | | 11/1985 | Ames et al. | |
| 4,712,920 A | | 12/1987 | Ames et al. | |

(Continued)

FOREIGN PATENT DOCUMENTS

| EP | 0 315 439 A2 | 5/1989 |
| EP | 1 415 543 A2 | 5/2004 |

(Continued)

OTHER PUBLICATIONS

International Search Report and Written Opinion issued in PCT/US2014/014557, dated May 7, 2014.

(Continued)

*Primary Examiner* — Cassey D Bauer
(74) *Attorney, Agent, or Firm* — Woodard, Emhardt, Henry, Reeves & Wagner, LLP

(57) ABSTRACT

An improved refrigeration compressor actuator is described for a chilled food dispensing apparatus. The actuator is connected to a temperature sensor located near or at the evaporator unit of the apparatus. The temperature of the apparatus is controlled by a compressor actuator that measures the temperature from the temperature sensor and is responsive to the rate of change in temperature per unit time.

8 Claims, 6 Drawing Sheets

(56) References Cited

U.S. PATENT DOCUMENTS

| | | | |
|---|---|---|---|
| 4,970,871 A | | 11/1990 | Rudick |
| 5,170,344 A | | 12/1992 | Berton et al. |
| 5,916,248 A | * | 6/1999 | Bravo .................... A23G 9/163 |
| | | | 426/519 |
| 5,987,897 A | * | 11/1999 | Hall .................... B67D 1/0864 |
| | | | 62/139 |
| 6,119,472 A | * | 9/2000 | Ross ........................ A23G 9/16 |
| | | | 62/228.2 |
| 6,357,250 B1 | | 3/2002 | Paxman |
| 6,370,892 B1 | | 4/2002 | Ross |
| 6,637,214 B1 | | 10/2003 | Leitzke et al. |
| RE42,006 E | | 12/2010 | Pham et al. |
| 2003/0000240 A1 | | 1/2003 | Pahl |
| 2005/0166761 A1 | * | 8/2005 | Jones .................... A47J 31/402 |
| | | | 99/275 |
| 2009/0105884 A1 | * | 4/2009 | Kaga ..................... F25B 49/025 |
| | | | 700/275 |
| 2011/0011887 A1 | | 1/2011 | Zaniboni et al. |
| 2012/0312049 A1 | | 12/2012 | Downs, III et al. |

FOREIGN PATENT DOCUMENTS

| | | |
|---|---|---|
| JP | 2001-225898 A | 8/2001 |
| JP | 2011-073775 A | 4/2011 |
| WO | WO 2011/053347 A1 | 5/2011 |

OTHER PUBLICATIONS

Supplemental European Search Report issued in related European Application No. EP 14 74 8892, dated Jul. 4, 2016.

* cited by examiner

CHILLED FOOD PRODUCT DISPENSER AND METHOD WITH ADAPTIVE CONTROL OF REFRIGERATION SYSTEM

CROSS-REFERENCE TO RELATED APPLICATION

This application is a continuation of International Patent Application No. PCT/US2014/014557, filed Feb. 4, 2014 which claims the benefit of provisional U.S. Patent Application No. 61/761,616, filed on Feb. 6, 2013 which is hereby incorporated by reference in its entirety.

BACKGROUND

There are many different types of preparation or dispensing devices for chilled, viscous edible foods such as soft ice cream commonly known as "soft serve", custard, gelatin and the like. These systems commonly operate as a stand alone unit that can be moved about on casters. They may contain a refrigeration unit, a reservoir or hopper that can be used as a storage vessel for unfrozen food, and a barrel or vessel where the food is frozen. The barrel may contain an agitator to move the food about in the barrel or vessel.

For quality control purposes and food safety concerns these preparation or dispensing devices often contain one or more temperature sensors that are used to sense the temperature of the product or the temperature of the refrigeration unit. The temperature sensors are often used to control the temperature of the refrigeration unit, particularly by setting a high temperature where the refrigeration unit compressor will cut-in or turn on and a low temperature where the compressor will cut-out or turn off.

There remains a need in this area for improved chilled food preparation or dispensing apparatuses.

SUMMARY

A compressor actuator controls the compressor of a refrigeration unit in response to the rate of change of temperature measured per unit time. This rate of change is then compared to a calculated or set value to determine whether the compressor should be actuated from an ON state or an OFF state. The rate of change may be measured by a variety of mathematical methods. These mathematical methods may include a calculation of change in temperature divided by change in time, numeric linear regression analysis, numeric derivative methods, or any other suitable method. The compressor actuator may include a microcontroller, microprocessor, or other digital or analog circuitry. The present invention may be implemented in an apparatus with one, two, or more freezing barrels.

Still further objectives, features, and advantages of the present invention will be more readily understood upon consideration of the following detailed description of the invention taken in conjunction with the accompanying drawings.

DETAILED DESCRIPTION

Figure 1:
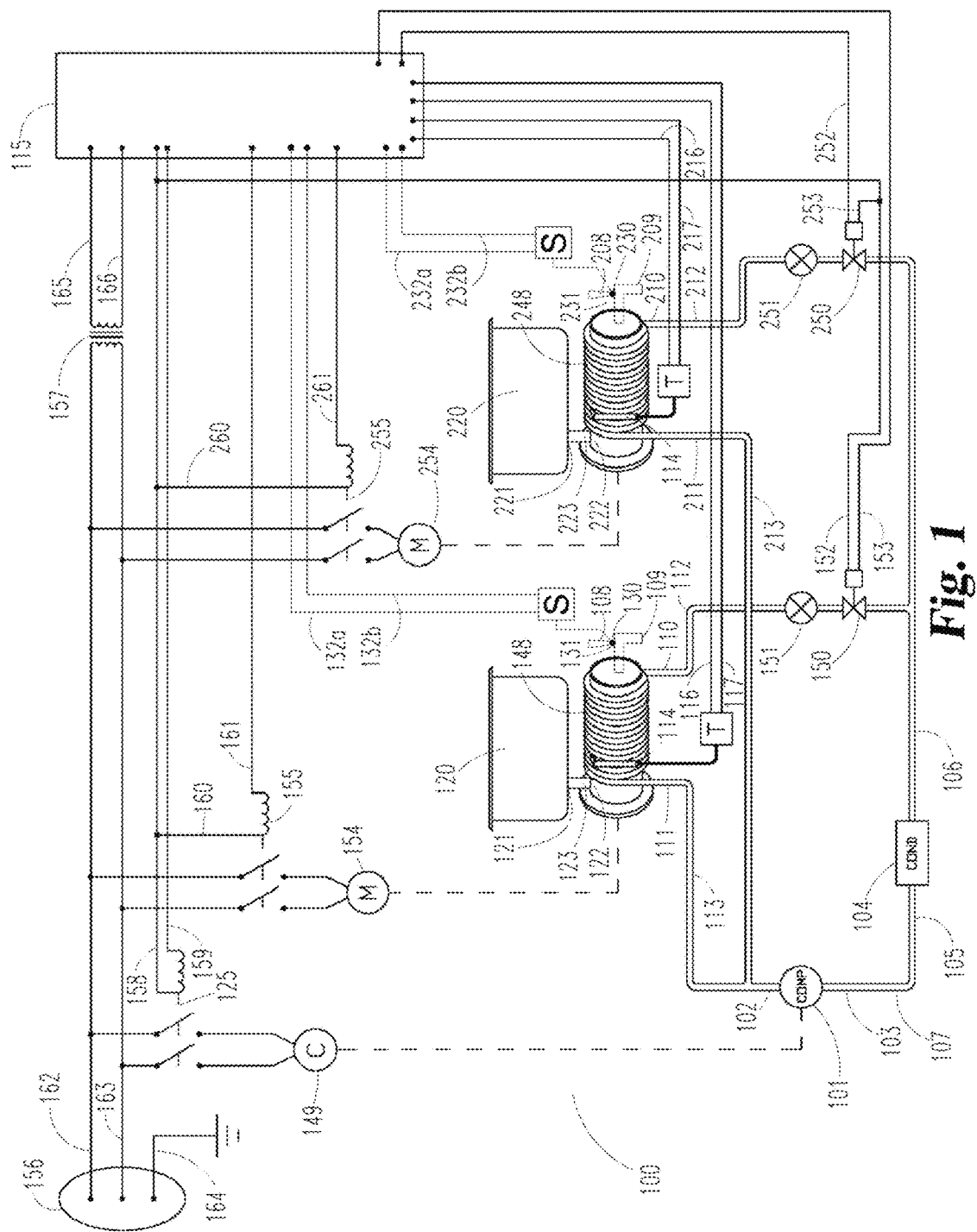
FIG. 1 shows the schematic of one embodiment of a chilled food processing apparatus of the present invention.

Reference will now be made to certain embodiments and possible variations thereof and specific language will be used to describe the same. It should nevertheless be understood that no limitation of the scope of this disclosure and the claims is thereby intended, and that such alterations, further modifications and further applications of the principles described herein are contemplated as would normally occur to one skilled in the art to which the disclosure relates. In several figures, where there are the same or similar elements, those elements are designated with the same or similar reference numerals, for example, in FIG. 1 where elements are labeled with a number in the 100's and a similar element exists elsewhere the similar element is labeled in the 200's.

FIG. 1 shows a preferred embodiment of a chilled food product dispensing apparatus 100. Apparatus 100 contains a compressor 101 having a compressor input 102 and a compressor output 103. The apparatus also contains a condenser 104 with a condenser input 105 and a condenser output 106. The condenser input 105 couples to compressor output 103 through connection 107.

This preferred embodiment contains chilled food product containers 108 and 208, each with a dispensing member 109 and 209 connected to it, respectively. These chilled food product containers are conventionally cylindrical, and thus are referred to as barrels, as shorthand. Evaporator units 148 and 248 are associated with the chilled food product container 108 or 208, respectively. Each of the evaporator units 148 or 248 has an input 110 and 210, and an output 111 and 211, respectively. Evaporator units 110 and 210 are coupled to the condenser output 106 by connections 112 and 212, respectively. The output of the evaporator units 110 and 210 are connected to compressor input 102 through connections 113 and 213, respectively. The apparatus also contain temperature sensors 114 and 214, preferably located near or at the evaporator unit 148 and 248, respectively. In one embodiment of the present invention, temperature sensor 114 and 214 are thermistors. While thermistors are preferred, alternative temperature sensors can be used, such as thermocouples, bimetal-strip based sensors, or other temperature-sensitive devices.

Compressor 101 is controller by compressor actuator 115. Compressor actuator 115 preferably includes a microcontroller, but could as well be microprocessor, other digital devices, or even an analog circuit. The compressor actuator is ideally built into an original preparation or dispensing apparatus, but it could alternatively be retrofitted into an existing preparation or dispensing apparatus. The compressor actuator 115 is electronically coupled through connection pairs 116 and 117, and 216 and 217 to the temperature sensors 114 and 214, respectively.

Apparatus 100 includes hoppers 120 and 220, each serving as a liquid food reservoir with outputs 121 and 221, respectively. The outputs 121 and 221 of hoppers 120 and 220 each fluidly couple to the inputs 122 and 222 of the food product containers 108 and 208 through connections 123 and 223. A relay 125 is preferably used for direct control of compressor motor 149 that powers compressor 101. The relays shown (125, 155, and 255) are electro-mechanical but could equally well be solid-state alternatives. Relay 125 may be connected to compressor actuator 115 by electrical connections 158 and 159. Power to the apparatus is provided connecting to a power supply at 156 by way of connections 162, 163 and 164 (ground). Power connects preferably through a transformer 157 and electrical connections 165 and 166 to supply power to the compressor actuator 115 and through relay 125 to the compressor motor 149.

In the preferred dual dispensing form of apparatus 100, there are control valves 150 and 250 to separately control refrigeration of the two portions. Control valves 150 and 250 connect to compressor actuator 115 by electrical connection pairs 152 and 153, and 252 and 253. Thermal expansion valves 151 and 251 provide restricted flow between the condenser portion and evaporator portions of the single stage vapor compression refrigeration system. Chilled food product containers 108 and 208 each preferably have an agitator (hidden from view) to automatically agitate chilled food product within it. These agitators are rotated by motors 154 and 254, when their corresponding control relays 155 and 255 are closed, allowing power to flow from power supply 156 to the corresponding motors. Relays 155 and 255 are controlled from compressor actuator 115 through electrical connection pairs 160 and 161, and 260 and 261, respectively.

In one embodiment, sensors 130 and 230 sense the operation of dispensing member 109 or 209. The output of sensors 130 and 230 are electrically connected via connections 132a, 132b and 232a and 232b to the compressor actuator 115. The hoppers 120 and 220 may optionally contain a further cooling source or refrigeration unit not shown.

Figure 2:
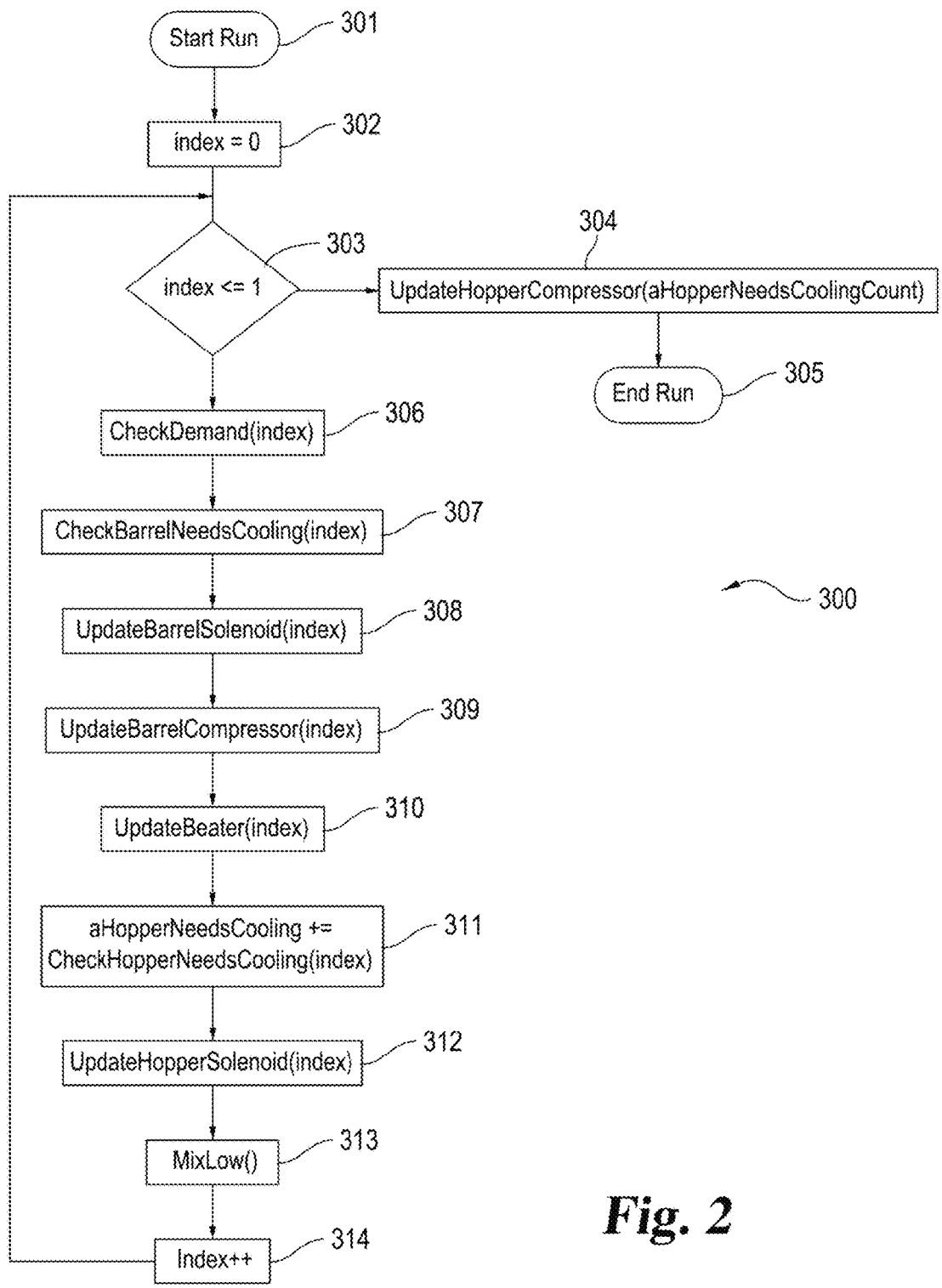
FIG. 2 shows a flow diagram of a first portion of a compressor actuator program suitable for use with the apparatus of FIG. 1.

Compressor actuator 115 is preferably a microcontroller programmed to actuate compressor 101. Alternatively, compressor actuator 115 could be a microprocessor, other digital or even purely analog circuitry. Referring now to FIG. 2 which shows one embodiment of a program that may be programmed into a microcontroller acting as a compressor actuator 115 (300). A run may be commenced (301) and an index may be set to an initial value, for example 0 (302). This index may be compared to a calculated or constant value, for example, 1 (303). A function may be called that senses or compares the state of the secondary cooling system for the reservoir or hopper 120 and 220 (304). A run may be terminated or finished (305). Alternatively, the demand on the apparatus may be sensed from a sensor 130 or 230 on the dispensing member 109 or 209 of the apparatus or by other appropriate sensor (306). In one embodiment of the invention the compressor actuator may check to see if barrel 108 or 208 needs cooling (307). The compressor actuator may check or update the status of control valves 150 and 250 (308). The compressor actuator 115 may actuate the compressor 101 (309). The compressor actuator may actuate the beater motor 154 or 254 (310). The apparatus of the current invention may also check the status of a secondary cooling system for reservoir or hopper 120 and 220, and update a status variable in response to that check (311) and may optionally update or control the secondary cooling system (312). The apparatus may also check the fluid level in reservoir 120 and 220 by any appropriate means including, but not limited to, conductivity, and optionally update a status variable depending on the status of the fluid level (313). An index variable may be updated (314) and the loop of the compressor actuator program may then be repeated by returning to step 303.

The compressor actuator 115 may optionally contain a sub-routine (400) to determine if the barrel 108 or 208 needs cooling. When such a sub-routine begins (401), a status variable may be set or checked to determine if the machine is, for example but not limited to, in a day mode or a night mode (402). Depending on such a status, a variable may be checked or set (404) and a cut-in or cut-out temperature for the compressor 101 that is used to cool the barrel 108 and 208 may be checked or set (405). A status variable then may be set or checked to determine if cooling of barrel 108 and 208 is necessary (406). A temperature may be read from temperature sensor 114 or 214 and this temperature may then be compared to a set or calculated cut-out temperature for the compressor 101 (407).

A status variable may be set or checked to determine if the apparatus needs cooling at the current state (408). A status variable may be set or checked to determine what temperature comparison algorithm may be used to control the compressor 101 of the chilled food product apparatus (409). The sub-routine may compare the temperature sensed at temperature sensor 114 or 214 to a variable that may be set or calculated to determine a cut-in temperature at which the compressor is actuated to the on state, this comparison may also include adjusting the temperature sensed at temperature sensor 114 or 214 by a value that is set or calculated (411). A variable used to indicate whether the apparatus or whether the compressor needs cooling at this state may then be set or updated (414). The comparison of 411 may set or check a variable on the status, for example, day or night status of the apparatus (412). The system may set cut-in or cut-out temperatures, depending on the status, for example, day or night, of the apparatus and further, this cut-in or cut-out temperature may be modified by a value that is set or calculated by the compressor actuator 115 (413).

Figure 3A:
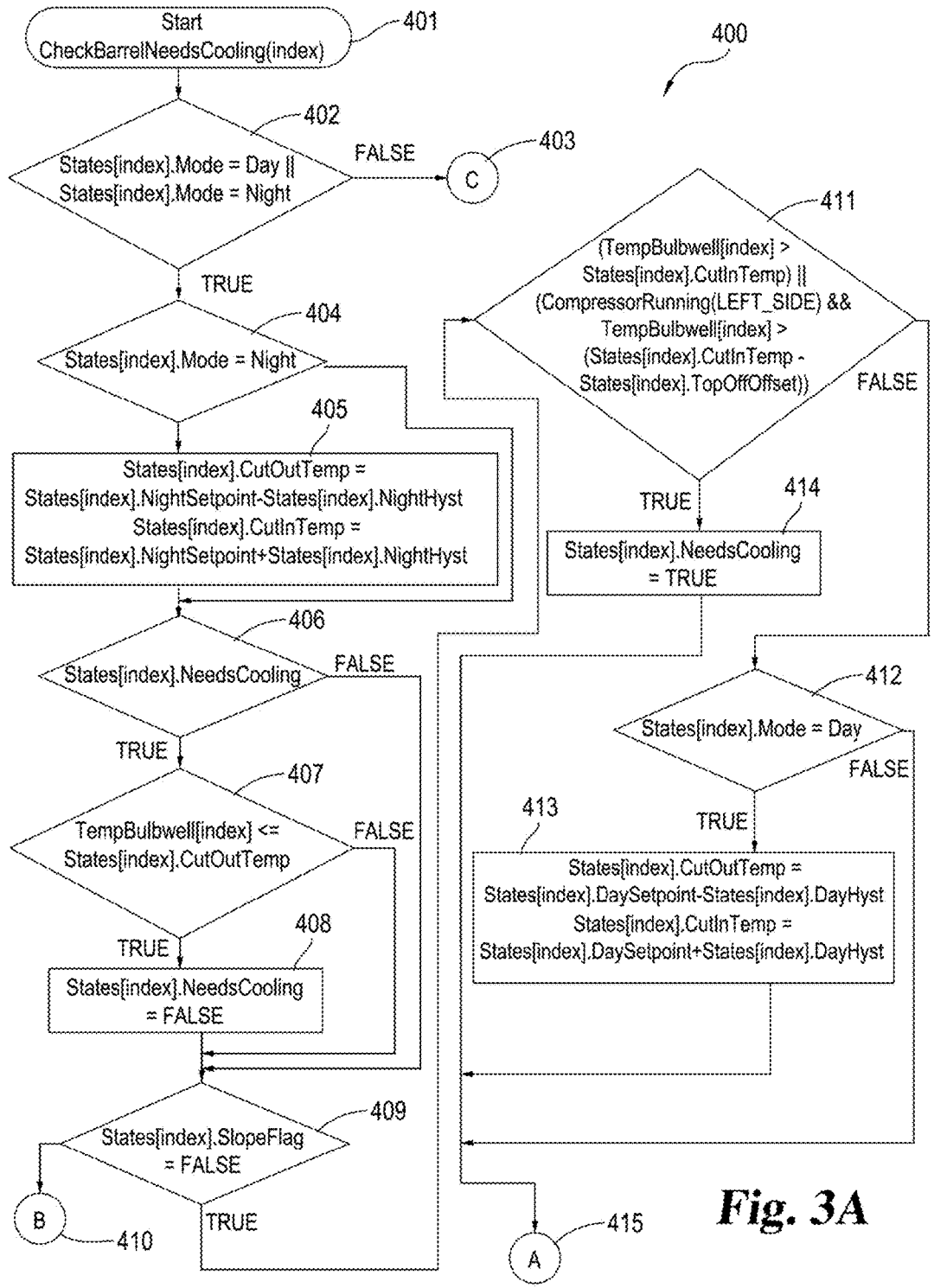
FIGS. 3A and 3B together show a flow diagram of a second portion of a compressor actuator program suitable for use with the apparatus of FIG. 1.
Figure 3B:
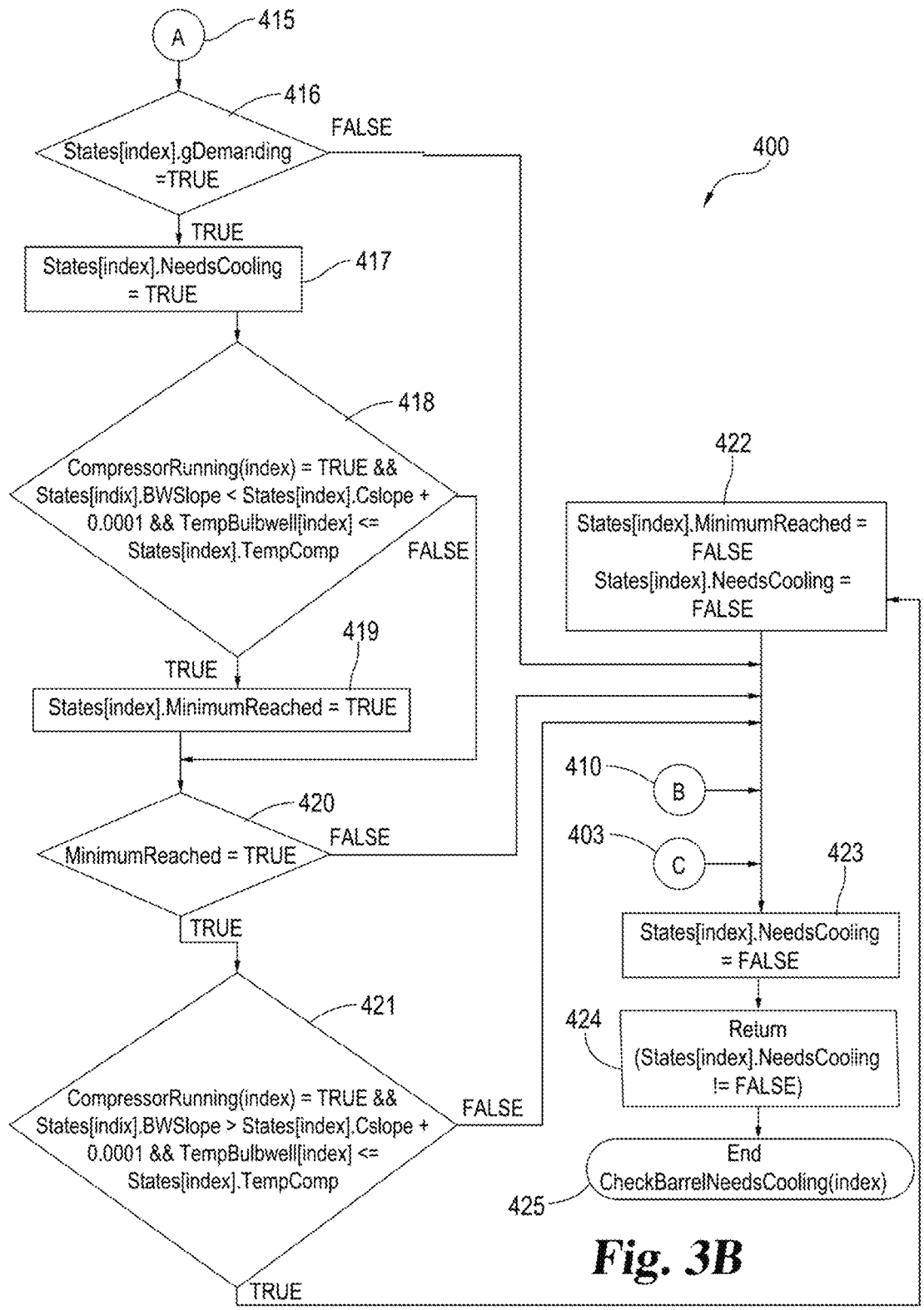
Figure 4:
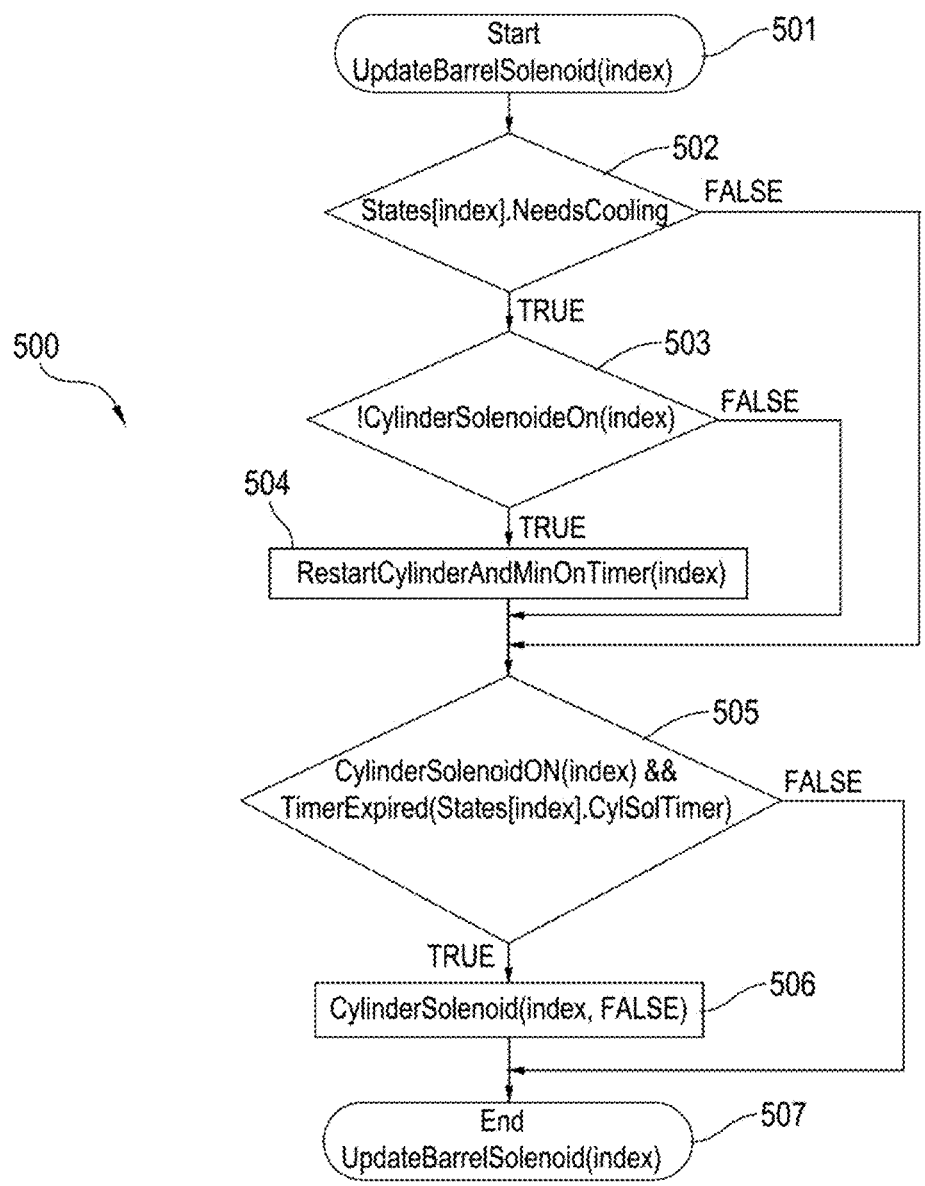
FIG. 4 shows a flow diagram of a third portion of a compressor actuator program suitable for use with the apparatus of FIG. 1.
Figure 5:
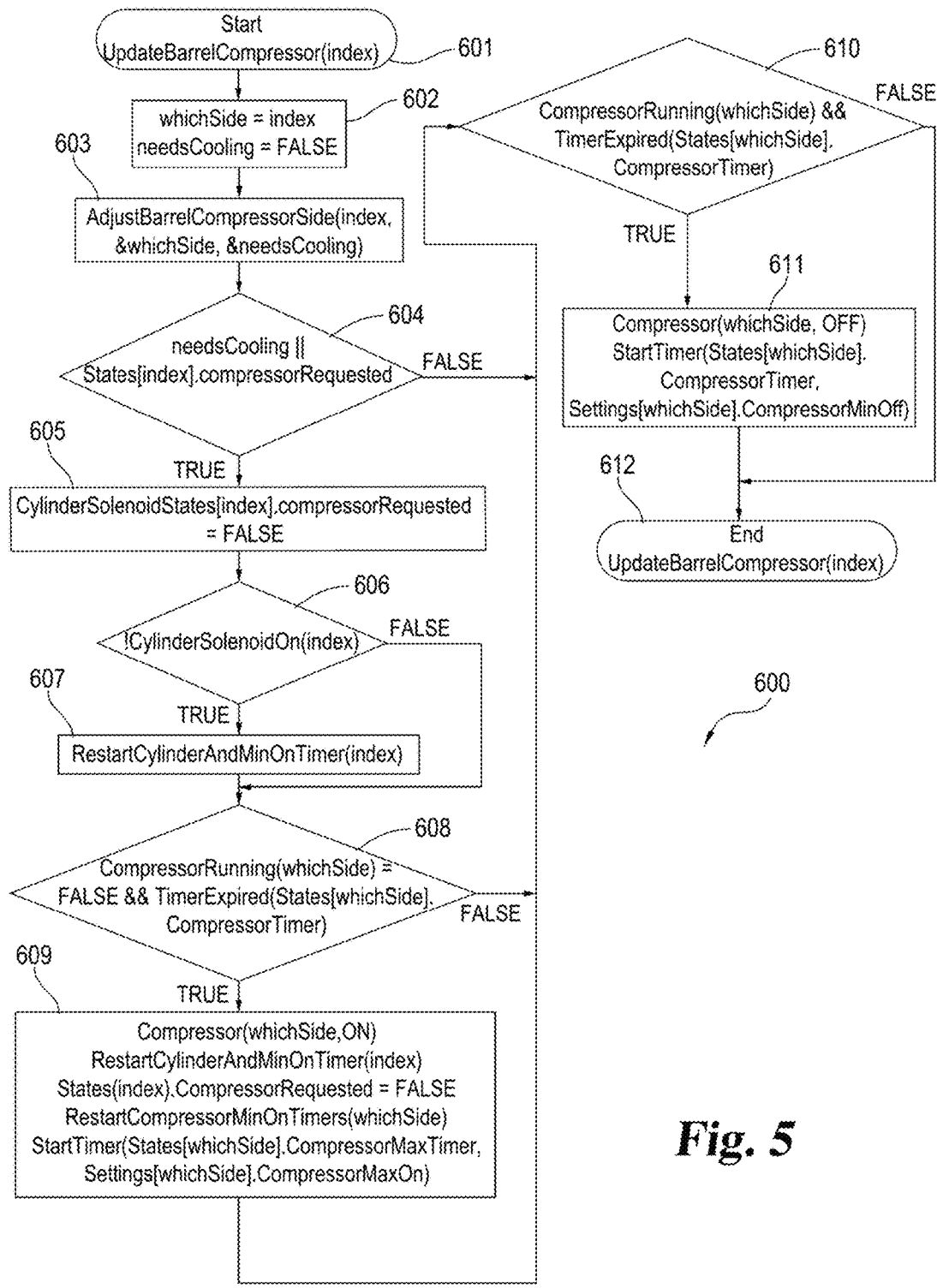
FIG. 5 shows a flow diagram of a fourth portion of a compressor actuator program suitable for use with the apparatus of FIG. 1.

The steps from FIG. 3A then continue to FIG. 3B and begin at "A" (415). Compressor actuator 115 may check or set the state in response to user demand from sensor 130 or 230 (416). A variable may be set or checked in response to whether the apparatus still needs cooling (417). A comparison may be performed which checks or sets the status of the compressor 101 or compares a calculated slope to a set or calculated rate of the rate of change of the temperature over a unit time, or compares the temperature sensed from temperature sensor 114 or 214 to a set or calculated temperature (418).

Other numerical methods used to calculate the rate of change in temperature per unit time may include, but is not limited to, performing a linear regression according to the formulas:

$$S_x = \sum_{i=0}^{N-1} (x_i - \bar{x})^2 \quad S_y = \sum_{i=0}^{N-1} (y_i - \bar{y})^2$$

$$S_{xy} = \sum_{i=0}^{N-1} (x_i - \bar{x})(y_i - \bar{y})$$

$$b = \frac{S_{xy}}{S_x}$$

$$a = \bar{y} - b\bar{x}$$

$S_x$, $S_y$, and $S_{xy}$ are defined as above where $x_i$ is a measured value in the x dimension, and $\bar{x}$ is a point on a best-fit line in the x dimension, and $y_i$ is a measured value in the y dimension and $\bar{y}$ is a point on a best-fit line in the y dimension and b is the calculated rate or slope of the best-fit line.

Or, calculating the rate of temperature change according to the formula:

$$m=(y_2-y_1)/(x_2-x_1)$$

where m is the calculated rate or slope and y2 and y1 are points in the y dimension, for example temperature dimension, and $x_2$ and $x_1$ are points in the x dimension, for example time.

A variable which indicates that a minimum temperature has been reached may then be set or checked (419 and 420). A comparison may be performed which checks the status of the compressor 101 in an on or off state or compares the calculated rate of change of temperature over a unit time to a set or calculated value, or compares the temperature sensed from temperature sensor 114 or 214 to a temperature that is set or calculated (421). The temperature sensed from temperature sensor 114 or 214 may then be adjusted by a value that is set or calculated. A step may be performed that sets or checks other system variables, for example, that a minimum temperature has been reached or a status variable that the system no longer needs cooling (422). Additional steps may be performed to set or check other variable (423, 424) before the sub-routine 400 is completed (425).

The compressor controller 115 may further contain other sub-routines used to check or set system statuses or affect system events. For example, sub-routine 500 may be used to set or check the status of control valve 150 or 250. The sub-routine begins at step 501. A status variable may be set or checked to determine whether the system needs cooling (502). A variable may be set or checked to determine whether the control valve 150 or 250 needs to be actuated (503). The sub-routine of 500 may contain a call to a function to set or reset a timer that may be used in the sub-routine of 500 or another sub-routine (504). A comparison may be performed to determine whether the valve of 150 or 250 is in an open or closed state and further, the comparison may evaluate the timer of step 504 (505). The sub-routine may also contain a step to set or check the control valve 150 or 250 (506) before the sub-routine ends (507).

The compressor actuator 115 may also contain additional sub-routines, for example, to check or determine whether a barrel 108 or 208 needs cooling, and to actuate the compressor 101, accordingly (600). Such a sub-routine may begin (601) and in a multi-barrel apparatus such as the one shown in FIG. 1, the sub-routine may determine which barrel needs cooling, for example, barrel 108 or barrel 208 (602), and may set or check a status variable in response to which side needs cooling (603). A comparison may be performed to determine if cooling is needed for a barrel, for example, 108 or 208 (604) and if cooling is needed, a status variable may then be set or checked in response to this comparison (605), and control valves may be actuated (605). The status of the control valves may be set or checked (606), a timer may be set or re-set (607), and a system variable may be compared to a timer (608). Other system variables may be checked or set (609), or a timer may be set or re-set or a variable may be compared to a timer (610). Compressor 101 may be actuated from an OFF state or an ON state and a timer may be set or re-set (611). Such a subroutine as in 600 may be called repeatedly in a loop, or may be called discretely.

Although preferred embodiments and the best mode of the invention have been described in the foregoing description, it will be understood that the invention is not limited to the specific embodiments disclosed herein but is capable of numerous modifications by one having ordinary skill in the art. It will be understood that the materials used and details may be slightly different or modified from the description herein without departing from the methods and compositions disclosed and taught by the present invention.

This disclosure serves to illustrate and describe the claimed invention to aid in the interpretation of the claims. However, this disclosure is not restrictive in character because not every embodiment covered by the claims is necessarily illustrated and described. All changes and modifications that come within the scope of the claims are desired to be protected, not just those embodiments explicitly described.

What is claimed is:

1. A chilled food product dispensing apparatus comprising:
   a. a compressor having an input and an output and an ON and OFF state;
   b. a condenser having an input connected to said compressor output and having and a condenser output;
   c. a chilled food product container;
   d. a dispensing member on said chilled food product container;
   e. an evaporator unit associated with said chilled food product container having an input coupled to said condenser output and an output connected to said compressor input;
   f. a temperature sensor near or at said evaporator unit measuring a first temperature at a first time and a second temperature at a second time; and
   g. a compressor actuator coupled to said temperature sensor where the rate of change in temperature between the first temperature and second temperature and the first time and second time is used calculate the rate of change in temperature per unit time and to change the compressor from an ON state to an OFF state in response to the rate of change in temperature per unit time as sensed by said temperature sensor.

2. The chilled food product dispensing apparatus of claim 1 further comprising a reservoir having an output wherein said chilled food product container further comprises an input wherein said reservoir output is fluidly connected to said chilled food product container input.

3. The chilled food product dispensing apparatus of any prior claim wherein said compressor actuator comprises a microprocessor unit.

4. The chilled food product dispensing apparatus of claim 1 wherein said compressor actuator comprises a relay.

5. The chilled food product dispensing apparatus of claim 1 wherein said temperature sensor is a thermistor.

6. The chilled food product dispensing apparatus of claim 1 wherein said temperature sensor is a thermocouple.

7. The chilled food product dispensing apparatus of claim 1 wherein said temperature sensor is a bimetallic strip.

8. The chilled food product dispensing apparatus of claim 1 further comprising a sensor mechanically connected to said dispensing member and electrically connected to said compressor actuator.

* * * * *